Nov. 7, 1933.  J. J. RAWLINGS  1,934,560

WALL PLUG

Filed July 14, 1932

INVENTOR
John J. Rawlings
BY James L. Norris
ATTORNEY

Patented Nov. 7, 1933

1,934,560

UNITED STATES PATENT OFFICE 1,934,560

WALL PLUG

John Joseph Rawlings, South Kensington, London, England, assignor to The Rawlplug Company Limited, London, England Application July 14, 1932, Serial No. 622,547, and in Great Britain July 25, 1931

6 Claims. (Cl. 72—105)

This invention relates to improvements in wall plugs or liners to be inserted in holes in brickwork, stone or other material in order to afford a secure hold for screws, nails or like fastenings, driven therein.

Heretofore it has been proposed to provide split tubes of metal, which may have asperities formed in the surfaces thereof and may have parts thereof overlapped one on another, such tubes being expanded by the insertion therein of, for example, a screw.

According to this invention a split or unsplit tube is formed with longitudinal or helical grooves or indents so that on the insertion of a screw, nail or like fastening means, pressure exerted on interior ribs or projections formed by the longitudinal grooves, will cause expansion of the tube, whereby it will become pressed closely against the wall of the hole into which it has been inserted. The threads of the screw, as the screw enters and expands the tube, indent or cut into the material of the tube at the parts forming interiorly projecting ridges and thus obtain a firm hold in the tube which at the same time is clamped effectively against the wall of the hole. To enable the threads of the screw to indent or cut into the material of the tube, the latter is made of a metal, e. g. zinc, which permits such action to take place and at the same time provides sufficient mechanical strength to enable the tube to hold the screw, nail or like fastening in position.

Figure 1:
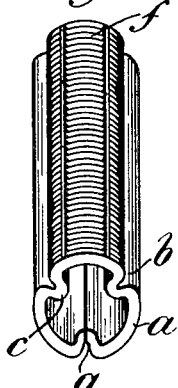
Figure 1 is a perspective view of a tubular metal wall plug made in accordance with this invention.
Figure 4:
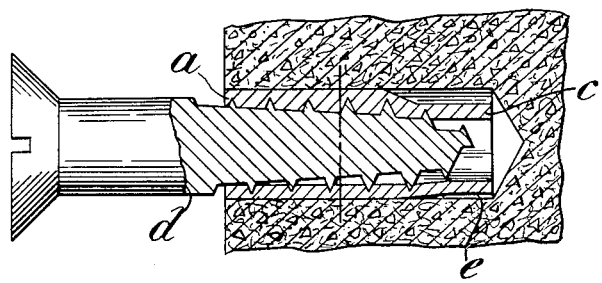
Figure 4 is a sectional view of a metal wall plug in accordance with this invention, inserted in a hole and having a screw inserted therein.
Figure 5:
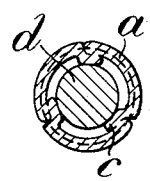
Figure 5 is an end view of a plug distorted by the insertion of a screw.

As shown in Figure 1 the tubular wall plug $a$ has longitudinal grooves $b$ formed therein providing interiorly projecting ribs $c$. When a screw $d$ is inserted therein, as shown in Figure 4 the tube $a$ is caused first to expand to bear firmly against the walls of the hole $e$ in which it has been inserted. When the tube can no longer expand by reason of the resistance offered by the wall of the hole, the ribs $c$ may become bent or flattened against the interior surface of the tube as shown in Figure 5. In any case, when a screw of the appropriate size is employed, after the expansion of the tube ceases, whether the ribs become bent or not, the threads of the screw cut into and are partially embedded in the ribs and thus the screw becomes secured in the tube.

For the purposes of this invention it is important to make the tubular longitudinally grooved wall plug or liner of a suitable metal, which can be conveniently indented or cut by the threads of a screw driven therein and at the same time is not so ductile that it will flow or bend under internally exerted pressure without causing the required expansion of the tube to force the outer surface thereof against the wall of the hole. With this object it has been found preferable to make the tube or wall plug of zinc or of a metal having similar physical properties to zinc.

The outer surface of the tube or plug at parts $f$, as shown, can be roughened or formed with projections thereon. By providing three or more interiorly projecting longitudinal ridges a central position of a screw or nail inserted therein will be ensured.

When the longitudinal grooves or indents are of such a depth that the interior ribs or projections formed thereby are deformed or bent over upon the insertion of a screw or the like, several layers or thicknesses of the tube or plug in closely folded formation are interposed between the screw or the like, and the wall, or surface of the hole in which the plug is inserted and the threads of the screw cut through one or more of these layers until the core of the screw comes into close contact with the ribs, which gives rise to great diametrically acting pressure.

Figure 2:
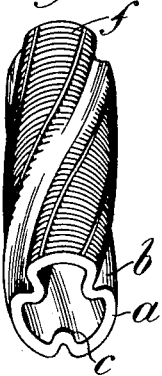
Figures 2, 3, 6 and 7 are, respectively, similar views of modified forms of the improved plug.
Figure 3:
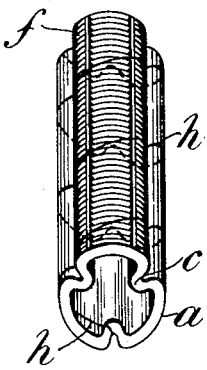

The grooves and ribs of the tube instead of extending parallel to the axis of the tube may be arranged helically, as shown in Figure 2, and the tube may be split axially along a line $g$ as in Figure 1 or helically along a line $h$, as in Figure 3.

Figure 6:
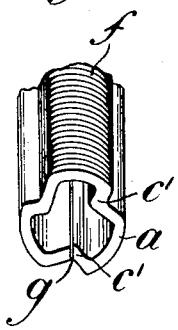

In Figure 6 the section differs from Figure 1 in that each of the ribs is formed with one wall $c'$ arranged radially, so that the metal is forced radially by the thread and core pressure of a screw acting against the inclined projections.

Figure 7:
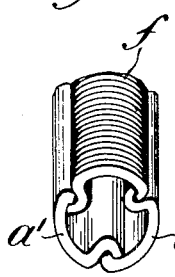

Figure 7 illustrates a section formed by three or more separate pieces $a'$ grooved and interlocked together, which expand when the screw is forced into it as before described.

Figure 8:
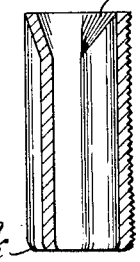
Figure 8 is a longitudinal section, and Figure 9 a plan of a plug internally coned and externally pointed, for facilitating the entry of the plug into a hole and the insertion of a screw into the plug.
Figure 9:

Figures 8 and 9 show a plug internally coned at its rear end as at $j$ and externally pointed at its forward end as at $k$ by pressing the ribs, so as to give a more easy entry of the screw point into the plug.

I claim:

1. A metal wall plug formed by a tube having a plurality of grooves extending longitudinally in the outside thereof so as to form corresponding ribs projecting into the interior of the tube, and having projections on the outer surface thereof between the said grooves.

2. A metal wall plug formed by a tube having a plurality of grooves extending longitudinally in the outside thereof so as to form corresponding ribs projecting into the interior of the tube and having projections extending in a circumferential direction on the outer surface thereof between the said grooves.

3. A metal wall plug formed by a tube of ductile metal having a plurality of grooves extending longitudinally in the outside thereof so as to form corresponding ribs projecting into the interior of the tube with the walls of the ribs angularly disposed to allow expansion of the tube, and having projections extending in a circumferential direction on the outer surface thereof between the said grooves.

4. A metal wall plug formed by a tube having a plurality of grooves in the outside thereof forming corresponding longitudinal ribs projecting into the interior of the tube with one of the walls of each rib disposed radially, and projections on the outside of the tube between the said grooves.

5. A metal wall plug comprising a plurality of longitudinally extending and laterally interlocked members forming a tube having a plurality of grooves extending longitudinally in the outside thereof so as to form corresponding ribs projecting into the interior of the tube, and having projections on the outer surface thereof between the said grooves.

6. A metal wall plug formed by a tube having a plurality of grooves in the outside thereof forming corresponding helical ribs projecting into the interior of the tube and having circumferential projections on the outside thereof between the said grooves.

JOHN JOSEPH RAWLINGS.